May 11, 1926.
A. URFER
1,584,495
LIQUID VOLUME INDICATOR
Filed June 19, 1924
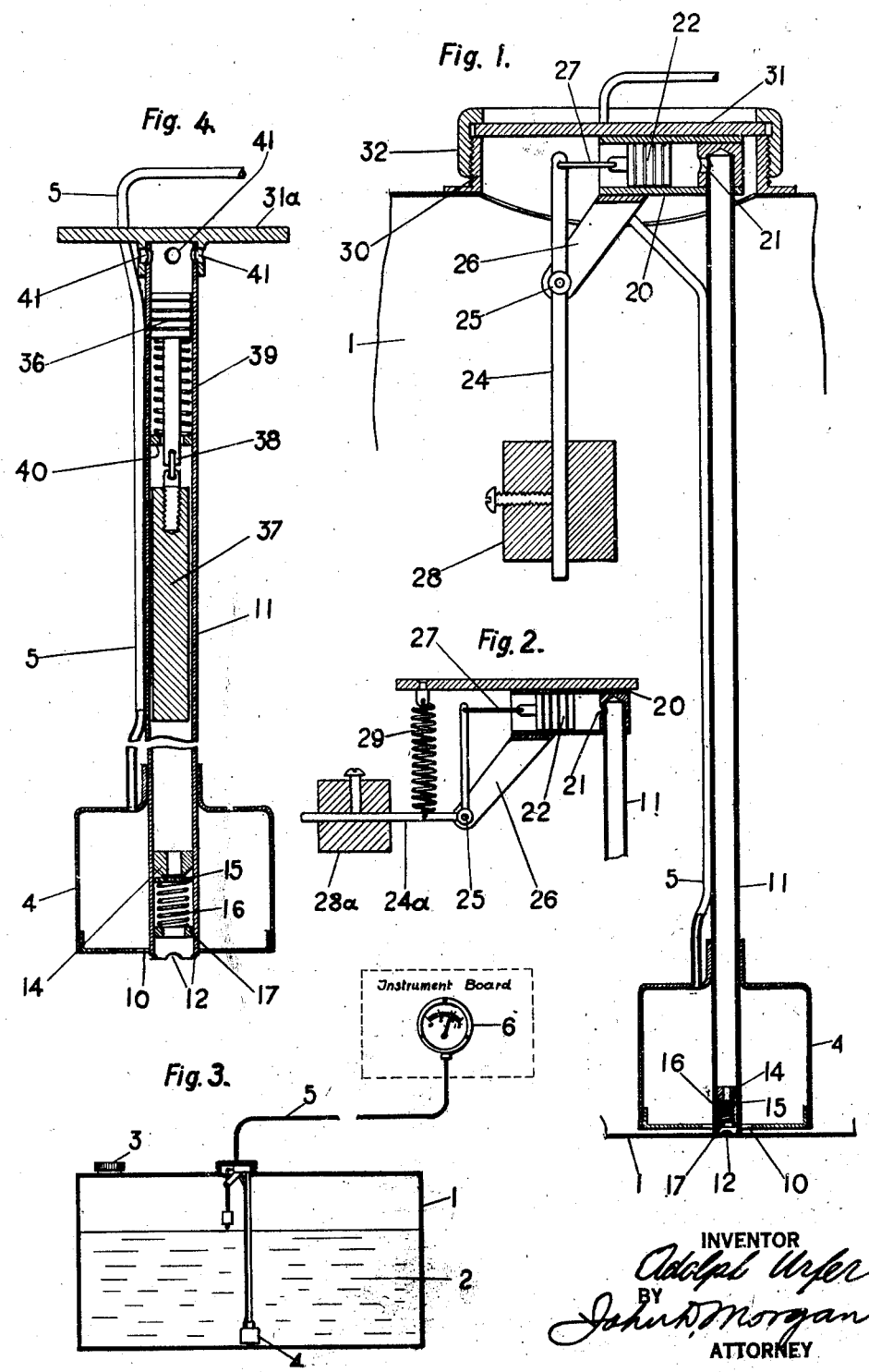
INVENTOR
Adolph Urfer
BY
John D. Morgan
ATTORNEY Patented May 11, 1926.

1,584,495

UNITED STATES PATENT OFFICE.

ADOLPH URFER, OF BROOKLYN, NEW YORK.

LIQUID-VOLUME INDICATOR.

Application filed June 19, 1924. Serial No. 720,883.

The invention relates to devices for indicating at a distance the level of a liquid in a reservoir, and more especially in certain aspects to means for maintaining reliable indications under varying conditions of operation.

It is a principal object of the invention to provide a device directed to maintaining accurate indications upon a gage or other indicator located at a distance from the reservoir in which the liquid to be measured is contained.

It is a particular object of the invention to provide means, used in connection with a pressure gage, which automatically replenishes the air supply to make up for losses due to leakage, expansion, or other causes.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a vertical central section of a mechanism embodying the invention;

Fig. 2 shows a somewhat different form of the mechanism at the upper part of Fig. 1;

Fig. 3 is a partly diagrammatic showing of the entire device; and

Fig. 4 is a central vertical section of a somewhat different form of the device.

The invention is directed to maintaining accurate indications upon a gage or other indicating device located at a distance from a liquid-containing reservoir of the height or quantity of liquid in the reservoir. In certain of its features, the invention provides such means mounted on a vehicle and operated by the motion of the vehicle to maintain the gage readings or other indications accurate, that is in exact conformity with the quantity of liquid in the tank.

The invention is, therefore, exemplarily shown as applied to an automotive vehicle in connection with the gasolene or other fuel tank, and an indicating gage on the dashboard, the gage operating by air pressure, which pressure is regulated by the height, i. e., the quantity of liquid in the fuel tank.

Referring now in detail to the embodiment of the invention, illustrated by way of example in the accompanying drawings, the gasolene or other fuel tank 1 of an automotive vehicle, such as an ordinary motor car, has a supply of gasolene or other liquid fuel 2 therewithin. The tank has a screw cap covered opening 3 for replenishment of the fuel. The means for supplying the fuel from the tank to the engine is not shown, but may be of any known or suitable form.

Within the liquid fuel 2 in the tank 1 is a device 4, to be later fully described, for measuring the liquid pressure due to the depth of the liquid by its corresponding pressure on air contained within the device. There are connections, including a pipe 5, from this pressure measuring device 4 for transmitting the pressure to a gage 6, which gage is marked or calibrated to give a reading in terms of the height of the liquid in the reservoir, or preferably the equivalent thereof in gallons, or other measure of volume.

In practice it has been found that in indicating devices operating by the liquid pressure being transmitted to an entrapped body of air, which pressure in turn is transmitted by the air to a gage, there are losses of the entrapped air. which render the gage readings inaccurate and misleading.

Among the causes which effect or contribute to this pernicious air leakage are extreme inclinations of the vehicle and tank; swashing of the liquid in the tank; the rise of temperature in the tank, causing expansion of the air in the expansion chamber and line (causing loss of air), with subsequent fall of temperature and contraction of volume of the air (and consequent change of level of liquid in the device); leakage at connections, etc. The escape of air from the expansion chamber causes the liquid to rise in the pressure transmitting chamber, and this causes an erroneous and misleading reading on the gage.

In the present embodiment, a pressure exchanging or transmitting chamber 4 is placed within and rests upon or near the bottom of the fuel tank 1. It is of cylindrical form and is closed at the top and bottom except for air and liquid transmitting openings. From the top of the chamber the pipe 5 communicates to the gage 6, as already described. When the chamber 4 is immersed in the liquid 2, the air therein is entrapped and compressed proportionately to the depth of liquid in the tank 1, the liquid having access to the interior of chamber 4 through an opening or openings 10 in the bottom of the chamber.

Means for maintaining the proper volume of air in the pressure exchanging or transmitting chamber, as embodied, comprises a pipe 11, entering at the top of the chamber, and passing downwardly therethrough and projecting from the bottom thereof through the opening 10 sufficiently to support the chamber clear of the floor of tank 1, to permit the ingress and egress of liquid and air. At its bottom end the pipe 11 has openings 12, through which air may escape from the pipe, and rising through opening 10, pass into the chamber 4.

Within pipe 11 is a one-way air valve, which permits downward passage of the air but prevents upward passage thereof. The valve comprises a centrally-apertured disc or head 14 in fixed position within the pipe, with a loose valve or disc 15 on the under side thereof. Valve 15 is held to the opening in disc 14 by a coiled compressed spring 16, the spring being seated on a centrally-apertured disc 17, fixed in pipe 11. Thus with downward flow of fluid, the valve 15 will open, but it will close against upward pressure.

Means are provided operated by the vehicle on which the device is mounted for maintaining the proper supply of air. In accordance with one feature of the invention it is an inertia device operated by the motion of the vehicle. In the embodied form of said means, at its upper end, pipe 11 is fixed to the closed end of an air pump cylinder 20 and has an opening 21 into the cylinder. Reciprocable in the cylinder is a piston 22, having a series of annular grooves in its cylindrical wall and with sufficient clearance within the cylinder to permit air leakage into the cylinder about the piston.

On the outward stroke of the piston 22, valve 15 closes and air is drawn into cylinder 20 around outwardly moving piston 22. On the inward stroke of piston 22, valve 15 opens and the air is forced out from the bottom of pipe 11 through openings 12, and passes through the opening 10 into chamber 4. Should the air pressure in chamber 4 become too great, the air will pass out through opening 10 and bubble up through the liquid until there is equilibrium. There is thus maintained always within chamber 4 an air pressure in exact balance with the liquid pressure and the gage indications will always be correct.

The embodied form of means for working the air pump operates automatically by the motion of the vehicle. In Fig. 1 such a mechanism is shown wherein a pendulum rod 24 is pivotally supported at 25 on a bracket 26, fixed to cylinder 20. At its upper end rod 24 is pivotally connected by a link 27 to piston 22. A weight 28 is attached to the bottom end of rod 24. Thus the pump will be actuated either by the acceleration and deceleration of the vehicle, or by its side sway, dependent on the angular direction in which the device is placed relatively to the vehicle.

In Fig. 2 a form of pump-operating means is shown which is actuated by the spring action or jouncing of the vehicle. In this the lever 24ª is bent, the lower arm extending out horizontally. A tension coil spring 29 operates to resiliently hold it in up position, and the inertia of the weight operates the pump on the up and down motion of the vehicle. In both these mechanisms the weight 28 is variably positionable on its rod 24 to vary the stroke of the pump for a given motion of the vehicle and thus to variably control the air supply.

The device is insertible into and removable from the tank, and for this purpose there is a cylindrical neck or opening 30, screw-threaded on its exterior. A flat plate 31 fits over the top thereof and preferably presses the device between it and the bottom of the tank and thus holds it in position. An angled and internally screw-threaded ring 32 screws onto the neck 30 and presses down on plate 31.

In Fig. 4 a different form of air-pumping device is shown. A piston 36 works in the upper end of pipe 11, the pipe acting as the air cylinder. The weight 37 is loose within the pipe and is attached to piston 36 by a rod 38, which is preferably jointed to prevent binding. A coil spring 39 is in compression between the bottom of the piston and a centrally-apertured disc 40, fixed in the pipe 11, rod 38 passing loosely through the opening.

There are air-admitting openings 41 in the upper end of pipe 11, and the top of the pipe is nested in a cylindrical projection from the bottom of plate 31ª, this plate having air passages registering with passages 41.

In this device the spring action or jouncing of the vehicle operates the pump, the air being drawn in through openings 41, passing about the piston, through the central aperture in disc 40, about weight 37 and down to valve 15. When the weight descends, valve 15 opens and air is forced into chamber 4. On the up stroke, valve 15 closes, and the air is drawn around piston 36 and into the space beneath to be pumped into chamber 4 on the next stroke.

The invention in its broader aspects is not limited to the specific mechanisms shown and described but departures may be made therefrom within the scope of the accompanying claims without departing from the principles of the invention and without sacrificing its chief advantages.

What I claim is:—

1. A device for indicating the quantity of liquid in a reservoir including an air-containing pressure-transmitting chamber immersed in and communicating with the liquid in the reservoir, an external pressure-responsive indicator having an air connection to the chamber, and a reciprocating inertia air pump adapted to be operated by bodily movement imparted to the pump so as to force air into said chamber to replenish the air supply therein.

2. A device for indicating the quantity of liquid in a reservoir including in combination an air-containing pressure-transmitting chamber immersed in and communicating with the liquid in the reservoir, an external pressure-responsive indicator having an air connection to the chamber and inertia means adapted to be actuated by the motion of a vehicle on which the tank may be mounted for replenishing the loss of air from said chamber.

In testimony whereof, I have signed my name to this specification.

ADOLPH URFER.